United States Patent [19]

Matulewicz

[11] Patent Number: 4,684,475

[45] Date of Patent: Aug. 4, 1987

[54] ORGANOPHOSPHATE AND SILICATE CONTAINING ANTIFREEZE

[75] Inventor: William N. Matulewicz, Montgomery, N.Y.

[73] Assignee: First Brands Corporation, Danbury, Conn.

[21] Appl. No.: 633,444

[22] Filed: Jul. 23, 1984

[51] Int. Cl.[4] .............................................. C09K 5/00
[52] U.S. Cl. ..................................... 252/75; 252/78.5; 252/180; 252/389.2; 252/389.23; 422/15
[58] Field of Search ............ 252/75, 78.5, 180, 389.2, 252/389.23; 422/15

[56] References Cited

U.S. PATENT DOCUMENTS

| | | | |
|---|---|---|---|
| 3,282,846 | 11/1966 | Scott | 252/75 |
| 3,510,436 | 5/1970 | Silverstein et al. | 422/15 |
| 3,607,757 | 9/1971 | McDonald | 252/75 |
| 4,210,548 | 7/1980 | Hirozawa et al. | 252/75 |
| 4,360,474 | 11/1982 | Brady et al. | 260/429.5 |
| 4,382,008 | 5/1983 | Boreland et al. | 252/75 |
| 4,465,516 | 8/1984 | Danner et al. | 422/15 |

FOREIGN PATENT DOCUMENTS

| | | |
|---|---|---|
| 2530 | 6/1979 | European Pat. Off. . |
| 2756747 | 6/1979 | Fed. Rep. of Germany . |

*Primary Examiner*—Robert A. Wax
*Attorney, Agent, or Firm*—Gary L. Warner

[57] ABSTRACT

Antifreeze composition and composition concentrate containing at least one organophosphate and at least one silicate in buffer/alcohol, together with method of making and using the composition and composition concentrate.

13 Claims, No Drawings

4,684,475

ORGANOPHOSPHATE AND SILICATE CONTAINING ANTIFREEZE

FIELD OF THE INVENTION

The present invention relates generally to heat transfer fluids and, more specifically, to an antifreeze containing an organophosphate and a silicate as an anticorrosive agent.

BACKGROUND OF THE INVENTION

Conventional alcohol-based heat transfer fluids, such as automobile antifreezes, have the tendency to corrode the metal (e.g. most notably aluminum, but also copper, iron, brass and solder) surfaces of the heat transfer system. In automobile coolant systems, any aluminum corrosion that occurs not only damages the metal surface being attacked by corrosion, but also adversely affects other parts of the coolant system due to a phenomenon called "transport deposition". By virtue of transport deposition, soluble aluminum corrosion products formed at engine surfaces are carried to and precipitated on the cooler radiator tubes, where they form heat-insulating films or coatings that impair heat-transfer.

In view of this corrosion problem, numerous corrosion inhibitors have been developed over the years for use in antifreezes, including inorganic phosphates, silicates, phosphonates, borates, azoles, siliconates, nitrates, nitrites, and the like. The need for even more effective corrosion inhibitors in antifreezes has been fostered by the changing metallurgy of vehicular cooling systems in favor of increasing use of aluminum and by smaller, harder working automotive engines having high operating engine temperatures. In addition, there is a continuing need for antifreezes and antifreeze concentrates that are stable and clear prior to and during use, thereby facilitating ease of handling by the customer or user.

Certain organophosphate esters have been disclosed for use as lubricants and corrosion inhibitors. For example, ethylene oxide-containing organophosphates and propylene oxide-containing organophosphates and a method of preparing them are disclosed in U.S. Pat. No. 4,360,474. As an additional illustration, German patent application 2,756,747 discloses PO/EO and PO/BO- (butylene oxide) containing phosphate esters (wherein "EO" denotes ethylene oxide, "PO" denotes propylene oxide, and "BO" denotes butylene oxide) useful as lubricants and corrosion inhibitors. The compounds of this publication are made by reacting polyphosphoric acid with aliphatic diols, triols, or tetrols. The organophosphates of the German application have molecular weights between 200 and 8,000. This German application is primarily directed to low-foaming corrosion inhibited metalworking lubricating fluids and does not disclose antifreeze formulations.

OBJECT OF THE INVENTION

It is an object of the present invention to provide a stable, clear organophosphate and silicate containing antifreeze concentrate, and its corresponding diluted antifreeze composition, which is characterized by reduced corrosiveness toward metals, including aluminum, as compared to prior art antifreezes.

This and other objects will become apparent from a reading of the following detailed specification.

SUMMARY OF THE INVENTION

In one aspect, the present invention relates to an antifreeze composition concentrate comprising:
(a) alcohol,
(b) at least one buffer selected from the group consisting of salts of boric, phosphoric, benzoic, substituted benzoic, and dibasic acids having from 6 to 20 carbon atoms, and mixtures thereof, and
(c) at least one organophosphate in a corrosion inhibiting-effective amount, and
(d) at least one silicate selected from the group consisting of organic and inorganic silicates, and mixtures thereof.

In another aspect, the present invention relates to the antifreeze composition produced by diluting the above concentrate with water and/or alcohol.

In still another aspect, the present invention relates to a method of using the above antifreeze composition and composition concentrate which comprises adding the above antifreeze composition to an automobile engine cooling system.

DETAILED DESCRIPTION OF THE INVENTION

The preferred organophosphates useful in the present invention are those made by reacting phosphoric acids with aliphatic mono-ols, diols, triols or tetrols containing either all PO- or PO/EO-mixtures with a PO content of at least 60% based on the weight of the PO+EO in the alcohol reactant. Such a reaction is well-known and is described by L. W. Burnette in *Nonionic Surfactants*, vol 1, p 372–394 (Marcel Dekker, Inc. 1966).

Generally the organophosphates useful in the present invention are identified by the structural formula:

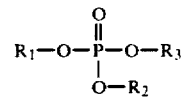

wherein each substituents $R_1$, $R_2$, and $R_3$ are selected from the class consisting of the following radicals: hydrogen; alkyl, aryl, alkenyl and alkynyl, with each of the foregoing having up to about 24 carbon atoms; alkyleneoxy, polyalkyleneoxy; phosphate, polyphosphate and their salts, and combinations thereof; with the proviso that at least one of said substituents is an organic radical listed above or combinations thereof.

The preferred organophosphates have the structural formula identified above wherein at least one R substituent consists of an organic radical containing an alkylene oxide polymer or copolymer $R_4O(PO)_x(EO)_y(BO)_z$—, wherein the alkyleneoxide units may be either random or blocked where $x>y>>z$ and $x+y+z \leq$ about 100, and $R_4$ is selected from the class of radicals: hydrogen; alkyl, aryl, alkenyl and alkynyl with the foregoing having up to about 24 carbon atoms; phosphate, polyphosphate and salts thereof, and combinations of the above. These organophosphates preferably have molecular weights below about 10,000 to insure solubility in the antifreeze composition.

The amount of organophosphate employed in the concentrates of the present invention can vary over a wide range, but is preferably used in an amount of between 0.001 and about 30 weight percent, more preferably between about 0.005 and about 1, most preferably between about 0.005 and about 0.1, based on the weight of the concentrate. Below the 0.001 weight percent, the amount of organophosphate is expected to be insufficient to be effective, whereas above about 30 percent organophosphate is expected to provide no significant further corrosion inhibition benefits.

Preferred organophosphates are identified by structural formulae I to III, and the free acids and salts thereof, together with mixtures thereof.

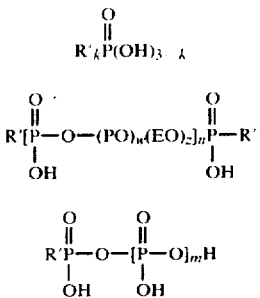

wherein
R' = [RO(PO)$_x$(EO)$_y$] wherein R = H or alkyl, aryl, alkylaryl, arylalkyl, alkenyl or alkynyl having up to 24 carbon atoms
PO = Propylene oxide radical
EO = Ethylene oxide radical
x = 1 to 100
y = 0 to 100
k = 1 to 3, with the proviso that when k can be 3 if at least one R' group is removed from the phosphate ester by hydrolysis prior to or during use
n = 1 to 100
w = 0 to 100, with the proviso that when w is ≧ 1, x can be zero
z = 0 to 100
m = 1 to 10

Within a given formula where x, y, w or z values appear more than once, the values may be the same or different number.

Typical useful classes or organophosphates falling within the groups identified by structural formulae I through III above, are identified as follows:

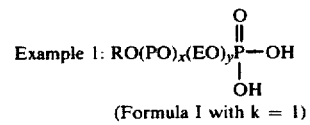

(Formula I with k = 1)

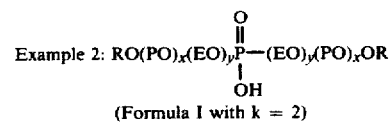

(Formula I with k = 2)

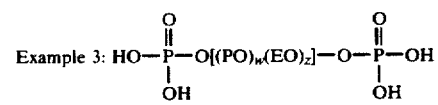

$$\begin{pmatrix} \text{Formula II with n = 1} \\ x = 0 \\ y = 0 \\ R = H \end{pmatrix}$$

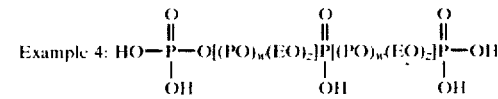

$$\begin{pmatrix} \text{Formula II with n = 2} \\ x = 0 \\ y = 0 \\ R = H \end{pmatrix}$$

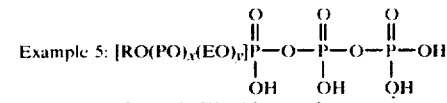

(Formula III with m = 2)

Additionally, the preferred organophosphates useful in the present invention can contain minor amounts of higher alkylene oxide moieties such as, for example, butylene oxide (BO), in an amount of up to 10 weight percent based upon the total weight of alkylene oxide present.

Inorganic silicates useful in the present invention include potassium and sodium silicates. Useful orthosilicate esters would include alkyl silicates such as methyl silicate, ethyl silicate, butyl silicate and amylsilicates; aryl silicates such as benzyl and tolyl silicates; mixed alkyl silicates such as methyl ethyl silicate; mixed aryl silicates such as benzyl tolyl silicate; mixed alkyl aryl silicates such as methyl benzyl silicate and ethyl tolyl silicate; glycol silicates such as hydroxyethyl glycol silicate and hydroxy propyl glycol silicate; and polyhydroxy alcohol silicates such as glycerol silicate and pentaerythritol silicate; oxyalkylene silicates such as methoxy diethylene glycol silicate, i.e. METHYL CARBITOL silicate; and mixtures of the above. The preferred silicates include potassium silicate, sodium silicate, tetramethylorthosilicate (TMS) and tetraethylorthosilicate (TES), and mixtures thereof.

Although the amount of silicate can vary over a wide range, it preferably does not exceed 1000 ppm, more preferably it does not exceed 750 ppm, as Si in the concentrate. Higher levels of silicate would generally be costly and/or difficult to keep in solution in the concentrate.

A buffer or mixture of buffers is employed in the antifreeze concentrates and compositions of the present invention. The buffer can be employed in a wide range of amounts, but is preferably used in an amount of between about 0.1 and about 10 wt. percent (preferably 0.1 to about 5 wt. percent) based on the weight of the concentrate. The borate buffer useful in the composition concentrate of the present invention is conveniently added as the sodium tetraborate pentahydrate salt. This salt is readily commercially available. After adding the salt, addition of sodium hydroxide can be used to provide the desired mixture of metaborates and tetraborates and sodium hydroxide in the concentrate. Among other functions, the buffer serves to provide the desired pH and reserve alkalinity (RA) during use. Preferably, the concentrate will have a pH of between about 5.5 and about 11 to provide a diluted antifreeze pH of between about 8 and about 11.

Other compounds useful as buffers in the composition concentrate of the present invention include: phosphates, such as alkali metal and alkanolamine phosphates such as triethanolamine phosphate; benzoates and substituted benzoates, such as alkali metal hydroxybenzoate; and, salts of dibasic acids having 6 to 20 carbons such as sodium sebacate.

The alcohol employed in the composition of this invention preferably is at least one alcohol selected from the group consisting of methanol, ethanol, propanol, ethylene glycol, diethylene glycol, triethylene glycol, propylene glycol, dipropylene glycol and glycerol. However, other alcohols can be used such as, for example, butylene glycol, and the monoacetate of glycerol, the dimethylether of glycerol alkoxyalkanols (such as methoxyethanol).

Optional additives may be employed in minor amounts of less than 50 wt. percent based on the weight of the concentrate. Typical optional additives would include, for example, known corrosion inhibitors for metals such as, for example, molybdates, phosphates and benzoates, hydroxy benzoates or acids thereof, silicones alkali metal nitrates, alkali metal nitrites, tolyltriazole, mercaptobenzothiazole, benzotriazole, and the like, or mixtures thereof. If one or more of the known inhibitors are employed together with the inhibitors of the present invention, the sum total of all inhibitors should be used in an "inhibitory effective amount", i.e., an amount sufficient to provide some corrosion inhibition with respect to the metal surfaces to be protected. Other typical optional additives would include wetting agents and surfactants such as, for example, known ionic and non-ionic surfactants such as the poly(oxyalkylene) adducts of fatty alcohols; antifoams and/or lubricants such as the well-known polysiloxanes and the polyoxyalkylene glycols, as well as any other minor ingredients known in the art that do not adversely affect the aluminum corrosion resistance sought to be achieved.

The following example is merely illustrative of, and not intended to limit the present invention.

EXAMPLE 1

A series of experiments was run to demonstrate the effectiveness of a silicate-organophosphate containing antifreeze as compared to antifreezes containing silicate or organophosphate individually. The silicate used was sodium silicate, whereas the organophosphate used was CYCLOPHOS PV-4, a propylene oxide/ethylene oxide based phosphate ester product of Cyclo Chemicals Corporation.

The ASTM Glassware Test (ASTM-D-1384) was used to compare antifreeze compositions as specified in Table I below. Each antifreeze was made by adding the component quantities, as specified in Table I, to yield a reserve alkalinity of about 30 and a 33 volume percent aqueous pH of 9.1. The formulations for each antifreeze are given in Table I below. Following ASTM-D-1384, various metal specimens, as identified in Table II below, were immersed in beakers containing the antifreeze sample at about 180° F. for 336 hours and metal weight loss of each specimen was determined. The test results for an average of two runs are presented in Table II which follows.

TABLE I

| Antifreeze Compositions (in weight percent) | | | |
| --- | --- | --- | --- |
| Component | Fluid #1 | Fluid #2 | Fluid #3 |
| Ethylene Glycol | 96.8601 | 96.6378 | 96.7489 |
| Na₂B₄O₇.5H₂O | 2.0531 | 2.0479 | 2.0505 |
| NaOH (50% aq.) | 1.0368 | 0.9480 | 0.9924 |

TABLE I-continued

| Antifreeze Compositions (in weight percent) | | | |
| --- | --- | --- | --- |
| | Fluid #1 | Fluid #2 | Fluid #3 |
| CYCLOPHOS PV-4 | 0.0500 | — | 0.0250 |
| Sodium Silicate* | — | 0.3663 | 0.1832 |
| | 100.0000 | 100.0000 | 100.0000 |
| Physical Properties | | | |
| pH - Conc. | 7.1 | 7.2 | 7.2 |
| 33% by volume | 9.1 | 9.1 | 9.1 |
| RA ASTM D-1121 | 30.3 | 30.6 | 30.7 |

*Grade 40, a product of Diamond Shamrock.

TABLE II

ASTM-D-1384
Metal Weight Loss Results
(mgs. wt. loss per 1 inch × 2 inch metal specimen)

| Fluid No. | Component Amount in Conc. | Cast Al | Fe | Steel | Br* | ASTM Solder | Cu | High Lead Solder |
| --- | --- | --- | --- | --- | --- | --- | --- | --- |
| 1 | PV-4, 500 ppm | 75 | 6 | 2 | 10 | 6 | 10 | 161 |
| 2 | Si 500 ppm | 48 | +2 | 2 | 10 | +1 | 8 | 110 |
| 3 | PV-4, 250 ppm + Si 250 ppm | 36 | +6 | 2 | 11 | 4 | 10 | 170 |

*brass

The above results demonstrate the synergestic interaction of sodium silicate with PV-4 organophosphate in an antifreeze providing a surprising reduction in corrosion to 36 mg. per aluminum specimen as compared to 75 and 48 mg. of weight loss for the aluminum specimen when using PV-4 or sodium silicate individually, respectively.

EXAMPLE 2

Another ASTM Glassware test (ASTM-D-1384) was run to demonstrate the individual and combined effectiveness of tetraethylorthosilicate (TES) and an organophosphate ester in the form of Union Carbide's UCON "LB-285" modified by end-capping with a nominal 3-ethylene oxide units and subsequently phosphorylated with P₂O₅ (hereinafter "LB-285-3EO-P"), identified by structural formula as follows:

n-BuO(PO)$_x$(EO)$_y$PO$_3$H$_2$ wherein Bu=butyl, x=17; y=3 on average.

The individual formulations are presented in Table III below and the results are presented in Table IV which follows:

TABLE III

| Antifreeze Compositions (in weight percent) | | | |
| --- | --- | --- | --- |
| Component | Fluid #4 | Fluid #5 | Fluid #6 |
| Ethylene Glycol | 96.9972 | 96.6764 | 96.8368 |
| Na₂B₄O₇.5H₂O | 1.9620 | 1.9620 | 1.9620 |
| NaOH (50% aq.) | 0.9908 | 0.9908 | 0.9908 |
| LB285-3EO-P*** | 0.0500 | — | 0.0250 |
| TES** | — | 0.3708 | 0.1854 |
| | 100.0000 | 100.0000 | 100.0000 |
| Physical Properties | | | |
| pH - Conc. | 7.1 | 7.1 | 7.1 |
| 33% by volume | 9.2 | 9.2 | 9.2 |

TABLE III-continued

Antifreeze Compositions
(in weight percent)

| | Fluid #4 | Fluid #5 | Fluid #6 |
|---|---|---|---|
| RA ASTM D-1121 | 28.9 | 29.0 | 29.0 |

**Tetraethylorthosilicate

TABLE IV

ASTM-D-1384
Metal Weight Loss Results
(mgs. wt. loss per 1 inch × 2 inch metal specimen)

| Fluid No. | Component Amount in Conc. | Cast Al | Fe | Steel | Br | ASTM Solder | Cu | High Lead Solder |
|---|---|---|---|---|---|---|---|---|
| 4 | 500 ppm LB285-3EO-P | 40 | 1 | 5 | 8 | 8 | 7 | 723 |
| 5 | 500 ppm Si | 30 | 1 | 5 | 8 | 7 | 7 | 122 |
| 6 | 250 ppm LB285-3EO-P*** + 250 ppm Si | 27 | 0 | 4 | 7 | 6 | 7 | 94 |

The above results demonstrate the synergestic interaction of TES with organophosphate in an antifreeze providing a surprising reduction in corrosion weight loss to 27 mg. per aluminum specimen as compared to 40 and 30 mg. of corrosion for the aluminum specimen when using LB285 3EO-P organophosphate*** or sodium silicate individually, respectively. A synergistic reduction in weight loss was also observed for the combination of TES and organophosphate in high lead solder.

***see description above.

While this invention has been described with reference to certain specific embodiments, it will be recognized by those skilled in this art that many variations are possible without departing from the scope and spirit of the invention and that it is intended to cover all changes and modifications of the invention disclosed herein for the purposes of illustration which do not constitute departure from the spirit and scope of the invention.

I claim:

1. An antifreeze composition concentrate comprising:
   (a) alcohol,
   (b) at least one buffer selected from the group consisting of salts of boric, phosphoric benzoic, substituted benzoic, dibasic acids having 6 to 20 carbon atoms, and mixtures thereof,
   (c) at least one alkylene oxide-containing organophosphate, in a corrosion inhibiting-effective amount, wherein said organophosphate has a molecular weight below about 10,000 and is selected from the group defined by the following structural formulae I, II and III:

$$R'_k P(OH)_{3-k} \quad (I)$$

$$R'[P-O-(PO)_w(EO)_z]_n P-R', \text{ and} \quad (II)$$
with =O and OH groups on P

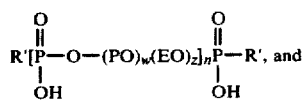
(III)

wherein
$R' = [RO(PO)_x(EO)_y]$ wherein R=H or alkyl, aryl, alkylaryl, arylalkyl, alkenyl or alkynyl having up to 24 carbon atoms,
PO=Propylene oxide radical,
EO=Ethylene oxide radical,
x=1 to 100,
y=0 to 100,
k=1 to 3, with the proviso that when k=3, at least one R' group is removed from the phosphate ester by hydrolysis prior to or during use,
n=1 to 100,
w=0 to 100, with the proviso that when w≧1, x can be zero,
z=0 to 100
m=1 to 10, and
   (d) at least one silicate selected from the group consisting of organic and inorganic silicates, and mixtures thereof.

2. The concentrate of claim 1 having a pH of between about 5.5 and about 11.

3. The concentrate of claim 1 wherein said silicate is selected from the group consisting of potassium silicate, sodium silicate, tetraethylorthosilicate, tetramethylorthosilicate, and mixtures thereof.

4. The concentrate of claim 1 wherein component (c) is present in an amount of between about 0.001 and about 30 weight percent based on the total weight of the concentrate.

5. The concentrate of claim 1 wherein component (c) is present in an amount of between about 0.005 and about 1 weight percent based on the total weight of the concentrate.

6. The concentrate of claim 1 wherein component (c) is present in an amount of between about 0.005 and about 0.1 weight percent based on the total weight of the concentrate.

7. The concentrate of claim 1 wherein component (b) is present in an amount of between about 0.1 and about 10 weight percent based on the total weight of the concentrate.

8. The concentrate of claim 1 wherein component (b) is present in an amount of between about 0.1 and about 5 weight percent based on the total weight of the concentrate.

9. The concentrate of claim 1 wherein component (d) is present in an amount not exceeding 1000 ppm as Si in the concentrate.

10. The concentrate of claim 1 wherein component (d) is present in an amount not exceeding 750 ppm as Si in the concentrate.

11. The concentrate of claim 1 wherein said alcohol is selected from the group consisting of ethylene glycol, diethylene glycol, propylene glycol, dipropylene glycol and mixtures thereof.

12. A method of cooling an automobile engine which comprises without regard to sequence, the steps of:
   (a) diluting the concentrate of claim 1 with water or a mixture of water and alcohol to produce a working antifreeze, and
   (b) adding the working antifreeze to an automobile engine coolant system.

13. An antifreeze composition comprising the concentrate of claim 1 and additionally containing water or aqueous alcohol.

* * * * *